US008806890B2

(12) United States Patent
Takagi

(10) Patent No.: US 8,806,890 B2
(45) Date of Patent: Aug. 19, 2014

(54) EVAPORATOR HAVING COLD THERMAL ENERGY STORAGE FUNCTION

(75) Inventor: Motoyuki Takagi, Oyama (JP)

(73) Assignee: Keihin Thermal Technology Corporation, Oyama-shi (JP)

( * ) Notice: Subject to any disclaimer, the term of this patent is extended or adjusted under 35 U.S.C. 154(b) by 189 days.

(21) Appl. No.: 12/998,784

(22) PCT Filed: Dec. 21, 2009

(86) PCT No.: PCT/JP2009/071211

§ 371 (c)(1), (2), (4) Date: Jun. 1, 2011

(87) PCT Pub. No.: WO2010/074016

PCT Pub. Date: Jul. 1, 2010

(65) Prior Publication Data

US 2011/0239696 A1 Oct. 6, 2011

(30) Foreign Application Priority Data

Dec. 26, 2008 (JP) ................................ 2008-332921

(51) Int. Cl.

*F25B 39/02* (2006.01)
*B60H 1/00* (2006.01)
*F28D 20/00* (2006.01)
*F28D 21/00* (2006.01)

(52) U.S. Cl.

CPC ........ *B60H 1/005* (2013.01); *F28D 2020/0008* (2013.01); *F28D 2021/0085* (2013.01)
USPC ............................................... 62/524; 62/515

(58) Field of Classification Search

CPC ..... B60H 1/005; F28D 15/00; F28D 20/0056; F28D 2020/0008; F28D 20/026; F28D 2020/0013
USPC ................................................... 62/524, 515
See application file for complete search history.

(56) References Cited

U.S. PATENT DOCUMENTS 4,393,918 A * 7/1983 Patry .............................. 165/10
4,565,242 A * 1/1986 Yano et al. ..................... 165/10

(Continued)

FOREIGN PATENT DOCUMENTS

CN 1688858 A 10/2005
JP 59-116787 U 8/1984

(Continued)

OTHER PUBLICATIONS

International Search Report dated Jan. 19, 2010, issued for PCT/JP2009/071211.

(Continued)

*Primary Examiner* — Ljiljana Ciric
*Assistant Examiner* — Alexis Cox
(74) *Attorney, Agent, or Firm* — Mori & Ward, LLP

(57) ABSTRACT

An evaporator having a plurality of flat refrigerant flow tubes disposed in parallel such that their width direction coincides with an air flow direction and they are spaced from one another. Air-passing clearances are formed between adjacent refrigerant flow tubes. Cool storage material containers filled with a cool storage material are disposed in some of the air-passing clearances, and each cool storage material container is brazed to the refrigerant flow tubes located on opposite sides thereof. Corrugated fins are disposed in the remaining air-passing clearances, and each fin is brazed to the refrigerant flow tubes located on opposite sides thereof. Each cool storage material container includes a plurality of convex portions projecting outward from opposite side surfaces thereof, and projecting ends of the convex portions are joined to the corresponding refrigerant flow tubes.

4 Claims, 3 Drawing Sheets

(56) References Cited

U.S. PATENT DOCUMENTS

| | | | | |
|---|---|---|---|---|
| 4,612,974 | A * | 9/1986 | Yanadori et al. | 165/10 |
| 4,738,303 | A * | 4/1988 | Lampe et al. | 165/10 |
| 4,924,935 | A * | 5/1990 | Van Winckel | 165/10 |
| 5,327,446 | A * | 7/1994 | Waynant | 372/61 |
| 5,327,746 | A * | 7/1994 | Duh | 62/530 |
| 5,644,929 | A * | 7/1997 | Tanaka et al. | 62/406 |
| 8,276,401 | B2 * | 10/2012 | Higashiyama et al. | 62/515 |
| 8,479,803 | B2 * | 7/2013 | Lim et al. | 165/10 |
| 2009/0007593 | A1 * | 1/2009 | Kerler et al. | 62/515 |
| 2009/0095015 | A1 * | 4/2009 | Kerler et al. | 62/524 |
| 2013/0047663 | A1 * | 2/2013 | Kamoshida et al. | 62/524 |

FOREIGN PATENT DOCUMENTS

| | | | |
|---|---|---|---|
| JP | 1-129587 | U | 9/1989 |
| JP | 04-052477 | A | 2/1992 |
| JP | H08-216670 | A | 8/1996 |
| JP | 2000-205777 | A | 7/2000 |
| JP | 2002-274165 | A | 9/2002 |
| JP | 4043776 | B2 | 9/2002 |
| JP | 2003-090689 | A | 3/2003 |
| WO | WO-2004/025208 | A1 | 3/2004 |

OTHER PUBLICATIONS

Office Action mailed Jan. 15, 2013, issued for the Japanese Patent Application 2008-332921.

Office Action dated Jan. 5, 2013, issued for the Chinese Patent Application No. 200980152315.5.

Office Action received in corresponding Chinese Application No. 100034 on Jun. 18, 2013.

* cited by examiner

EVAPORATOR HAVING COLD THERMAL ENERGY STORAGE FUNCTION

TECHNICAL FIELD

The present invention relates to an evaporator with a cool (cold thermal energy) storage function for use in a car air conditioner for a vehicle in which an engine serving as a drive source for a compressor is temporarily stopped when the vehicle is stopped.

BACKGROUND ART

In recent years, in order to protect the environment and improve fuel consumption of automobiles, there has been proposed an automobile designed to automatically stop the engine when the automobile stops, for example, so as to wait for a traffic light to change.

Incidentally, an ordinary car air conditioner has a problem in that, when an engine of an automobile in which the air conditioner is mounted is stopped, a compressor driven by the engine is stopped, and supply of refrigerant to an evaporator stops, whereby the cooling capacity of the air conditioner sharply drops.

As one measure to solve such a problem, imparting a cool storage function to the evaporator has been considered, to thereby enable cooling of a vehicle compartment by making use of cool stored in the evaporator, when the compressor stops as a result of stoppage of the engine.

An evaporator having a cool storage function has been proposed (see Patent Document 1). The proposed evaporator includes a plurality of flat refrigerant flow tube sections disposed in parallel such that their width direction coincides with an air flow direction, and they are spaced from one another; and hollow cool storage material containers each of which is fixedly provided on one side of a corresponding refrigerant flow tube section and contains a cool storage material therein. A plurality of sets each composed of a refrigerant flow tube section and a cool storage material container are provided at predetermined intervals along the longitudinal direction of header sections. Fins are disposed between adjacent sets each composed of a refrigerant flow tube section and a cool storage material container.

According to the evaporator having a cool storage function disclosed in Patent Document 1, a low temperature refrigerant flowing through the refrigerant flow tube sections enables storage of cool in the cool storage material within the cool storage material containers.

However, the evaporator having a cool storage function disclosed in Patent Document has a problem in that, when the effective core area is maintained constant, the number of the refrigerant flow tube sections decreases as compared with an ordinary evaporator having no cool storage material container, whereby cooling performance drops.

PRIOR ART DOCUMENT

Patent Document

Patent Document 1: Japanese Patent No. 4043776

SUMMARY OF THE INVENTION

Problems to be Solved by the Invention

An object of the present invention is to solve the above problem and to provide an evaporator with a cool storage function which can suppress a drop in cooling performance even when the effective core area is made equal to that of the evaporator with a cool storage function described in Patent Document 1.

Means for Solving the Problems

To achieve the above object, the present invention comprises the following modes.

1) An evaporator with a cool storage function which includes a plurality of flat refrigerant flow tube sections disposed in parallel such that their width direction coincides with an air flow direction and they are spaced from one another, wherein air-passing clearances are formed between adjacent refrigerant flow tube sections, cool storage material containers filled with a cool storage material are disposed in some of all the air-passing clearances, and fins are disposed in the remaining air-passing clearances.

2) An evaporator with a cool storage function according to par. 1), wherein each cool storage material container includes a plurality of convex portions projecting outward from opposite side surfaces thereof, and projecting ends of the convex portions are joined to the corresponding refrigerant flow tube sections.

3) An evaporator with a cool storage function according to par. 1), wherein the total of air-flow-direction-upstream-side opening areas of the air-passing clearances in which the cool storage material containers are disposed is 5 to 30% an effective core area.

4) An evaporator with a cool storage function according to par. 1), wherein the interiors of a plurality of cool storage material containers are connected with one another; and a cool storage material charging port is provided in one of the cool storage material containers connected with one another.

5) An evaporator with a cool storage function according to par. 1), wherein the interiors of all the cool storage material containers are connected with one another via a communication member; and a cool storage material charging port is provided on the communication member or one of the cool storage material containers.

Effects of the Invention

According to the evaporator with a cool storage function of par. 1), cool storage material containers filled with a cool storage material are disposed in some of all the air-passing clearances, and fins are disposed in the remaining air-passing clearances. Therefore, even when the effective core area is made equal to that of the evaporator with a cool storage function described in Patent Document 1, the number of the refrigerant flow tube sections does not decreases. Accordingly, a drop in cooling performance can be suppressed. Furthermore, since the cool storage material containers are joined to the refrigerant flow tube sections, a low temperature refrigerant flowing through the refrigerant flow tube sections enables storage of cool in the cool storage material within the cool storage material containers. Therefore, cool can be efficiently stored in the cool storage material.

According to the evaporator with a cool storage function of par. 2), each cool storage material container includes a plurality of convex portions projecting outward from opposite side surfaces thereof, and projecting ends of the convex portions are joined to the corresponding refrigerant flow tube sections. Therefore, even at the air-passing clearances in which the cool storage material containers are disposed, the convex portions form gaps between the refrigerant flow tube sections and the cool storage material containers, so that air flows through the gaps. Accordingly, an increase in air-passage resistance can be suppressed. Furthermore, condensed water produced on the outer surfaces of the refrigerant flow tube sections can be drained through the gaps formed between the refrigerant flow tube sections and the cool storage material containers due to presence of the convex portions enables.

According to the evaporator with a cool storage function of par. 3), it is possible to suppress an increase in air-passage resistance, while securing the effect of storing cool in the cool storage material charged in the cool storage material containers. That is, when the total of air-flow-direction-upstream-side opening areas of the air-passing clearances in which the cool storage material containers are disposed is less than 5% the effective core area, the amount of the cool storage material charged in the cool storage material containers becomes insufficient, and the cool storage effect becomes insufficient. When the total of air-flow-direction-upstream-side opening areas of the air-passing clearances in which the cool storage material containers are disposed exceeds 30% the effective core area, the air-passage resistance may increase considerably.

According to the evaporator with a cool storage function of par. 4), the cool storage material can be charged into the plurality of cool storage material containers connected with one another, from the cool storage material charging port provided in one of the cool storage material containers. Therefore, an operation of charging the cool storage material becomes simple, and overall manufacturing work is facilitated.

According to the evaporator with a cool storage function of par. 5), the cool storage material can be charged into all the cool storage material containers from the cool storage material charging port provided on the communication member. Therefore, an operation of charging the cool storage material becomes simple, and overall manufacturing work is facilitated.

Figure 1:
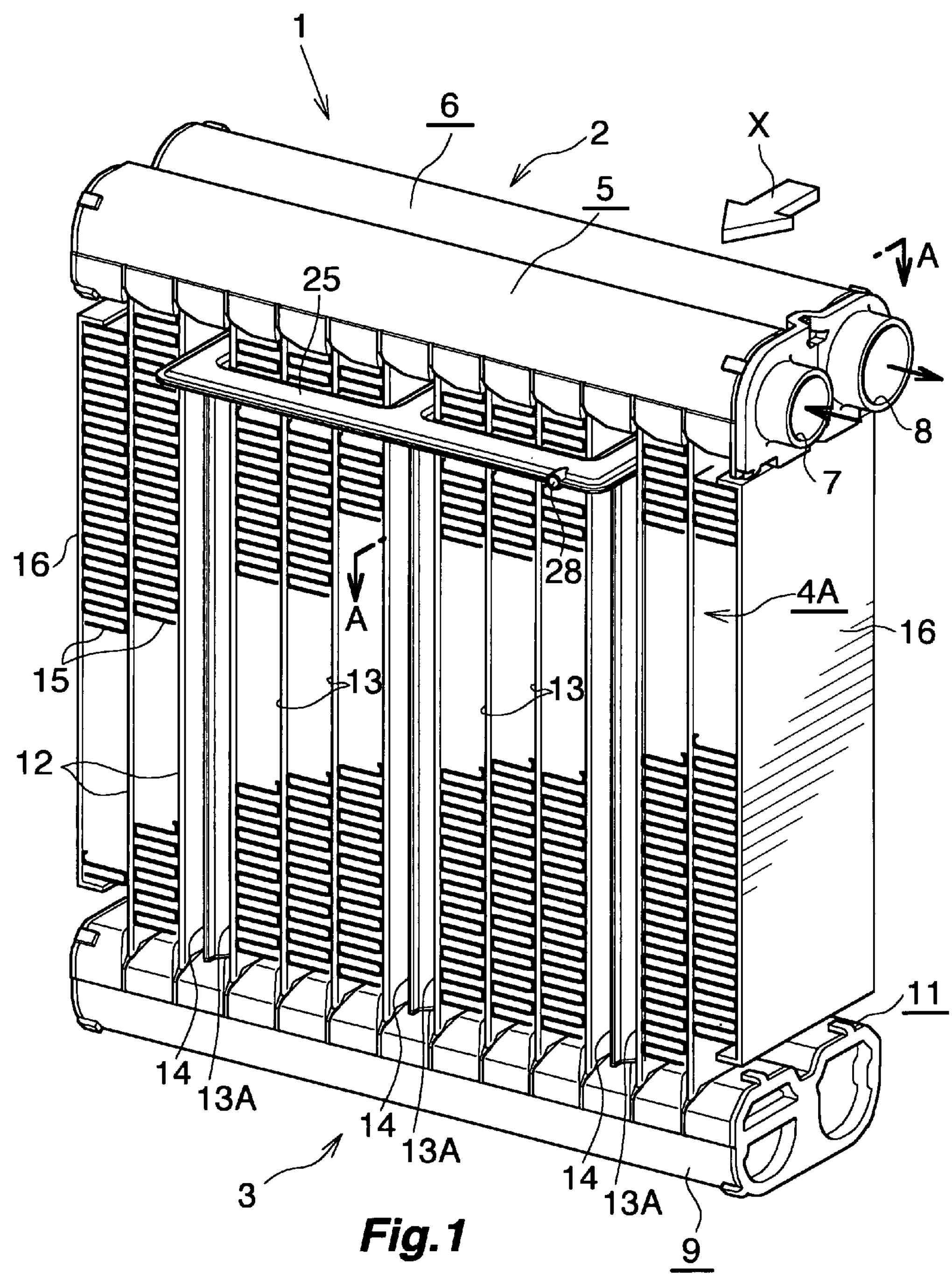
FIG. 1 is a perspective view showing the overall structure of an evaporator with a cool storage function according to the present invention.

DESCRIPTION OF REFERENCE NUMERALS (1): evaporator with a cool storage function
(12): refrigerant flow tube (refrigerant flow tube section)
(13), (13A): air-passing clearance
(14): cool storage material container
(15): corrugated fin
(23): convex portion
(25): communication member
(28): cool storage material charging port

MODE FOR CARRYING OUT THE INVENTION

An embodiment of the present invention will next be described with reference to the drawings.

In the following description, the downstream side (a direction represented by arrow X in FIG. 1) with respect to an air flow direction will be referred to as the "front," and the opposite side as the "rear." Further, the upper, lower, left-hand, and right-hand sides as viewed rearward from the front side; i.e., the upper, lower, left-hand, and right-hand sides of FIG. 1, will be referred to as "upper," "lower," "left, and "right," respectively.

In the following description, the term "aluminum" encompasses aluminum alloys in addition to pure aluminum.

Figure 2:
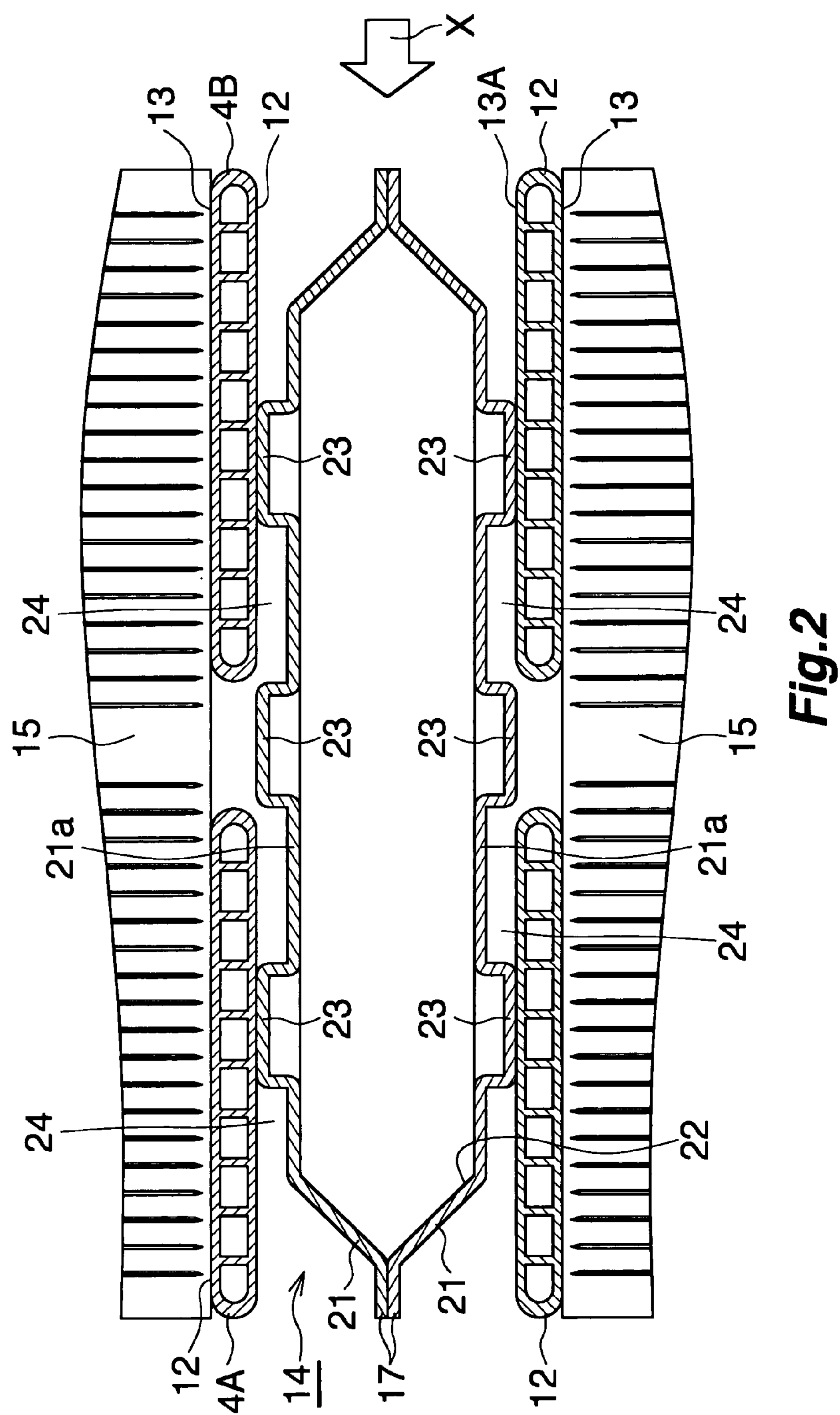
FIG. 2 is an enlarged sectional view taken along line A-A of FIG. 1.
Figure 3:
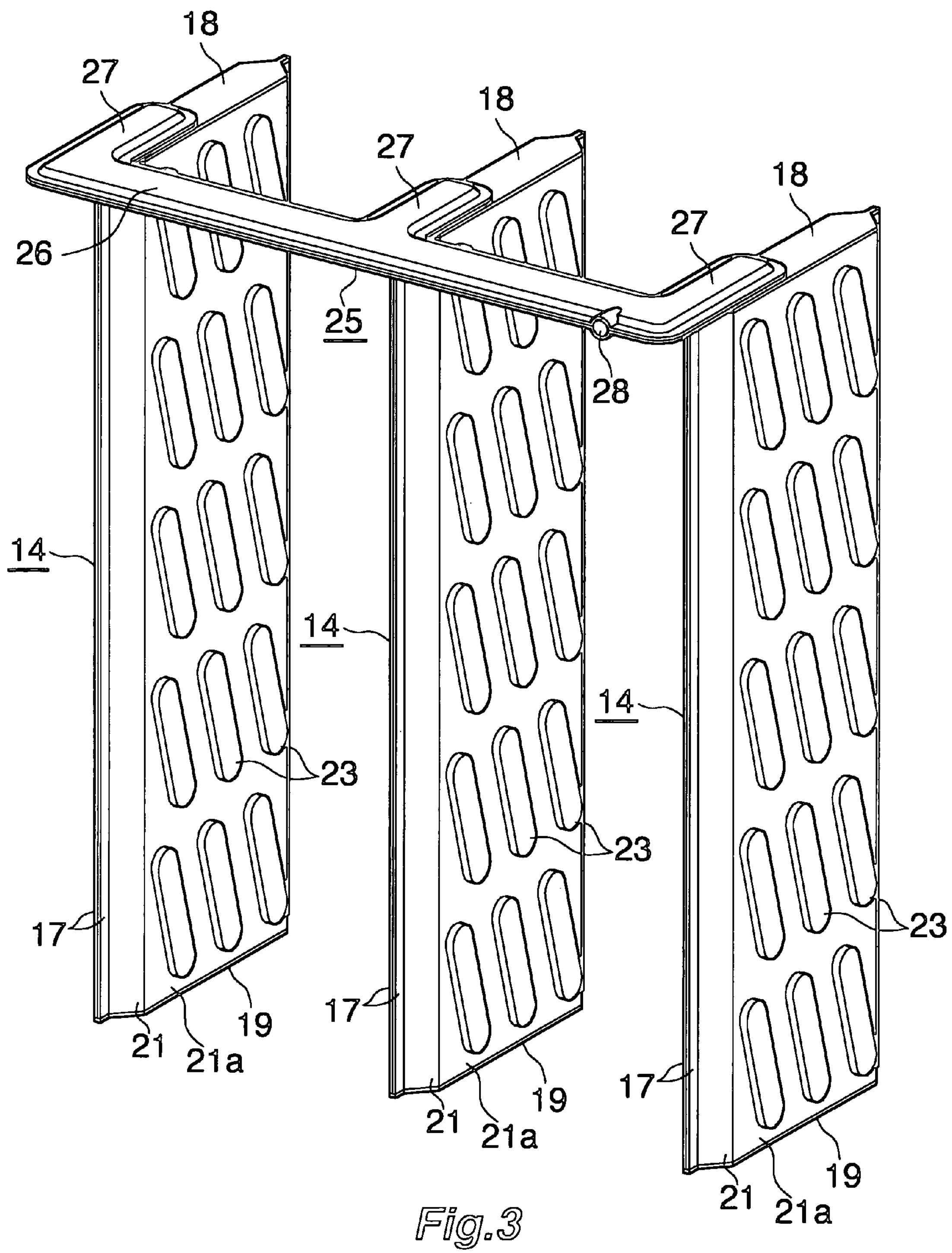
FIG. 3 is a perspective view showing cool storage material containers and a communication member.

FIG. 1 shows the overall configuration of an evaporator with a cool storage function according to the present invention, and FIGS. 2 and 3 show the configurations of essential portions of the evaporator.

As shown in FIGS. 1 and 2, an evaporator with a cool storage function (1) includes a first header tank (2) and a second header tank (3) formed of aluminum and disposed apart from each other in the vertical direction such that they extend in the left-right direction; and front and rear refrigerant flow tube rows (4A) and (4B) provided between the two header tanks (2) and (3) such that they are spaced from each other in the front-rear direction.

The first header tank (2) includes a refrigerant inlet header section (5) located on the front side (downstream side with respect to the air flow direction); and a refrigerant outlet header section (6) located on the rear side (upstream side with respect to the air flow direction) and united with the refrigerant inlet header section (5). A refrigerant inlet (7) is provided at the right end of the refrigerant inlet header section (5), and a refrigerant outlet (8) is provided at the right end of the refrigerant outlet header section (6). The second header tank (3) includes a first intermediate header section (9) located on the front side, and a second intermediate header section (11) located on the rear side and united with the first intermediate header section (9). The respective interiors of the first and second intermediate header sections (9) and (11) of the second header tank (3) are connected together by means of unillustrated proper means.

The front refrigerant flow tube row (4A) is composed of a plurality of flat refrigerant flow tubes (12) (refrigerant flow tube sections) formed of aluminum extrudate. The refrigerant flow tubes (12) are disposed between the refrigerant inlet header section (5) of the first header tank (2) and the first intermediate header section (9) of the second header tank (3) such that their width direction coincides with the front-rear direction and they are spaced from each other in the left-right direction. Upper and lower end portions of the refrigerant flow tubes (12) are brazed to the upper and lower header tanks (2) and (3), respectively. The rear refrigerant flow tube row (4B) is composed of a plurality of flat refrigerant flow tubes (12) (refrigerant flow tube sections) formed of aluminum extrudate. The refrigerant flow tubes (12) are disposed between the refrigerant outlet header section (6) of the first header tank (2) and the second intermediate header section (11) of the second header tank (3) such that their width direction coincides with the front-rear direction and they are spaced from each other in the left-right direction. Upper and lower end portions of the refrigerant flow tubes (12) are brazed to the upper and lower header tanks (2) and (3), respectively. Each refrigerant flow tube (12) of the front refrigerant flow tube row (4A) is located at the same position (with respect to the left-right direction) as the corresponding refrigerant flow tube (12) of the rear refrigerant flow tube row (4B). Air-passing clearances (13) and (13A) are formed between the refrigerant flow tubes (12) of the front refrigerant flow tube row (4A) which are adjacent to one another in the left-right direction, and between the refrigerant flow tubes (12) of the rear refrigerant flow tube row (4B) which are adjacent to one another in the left-right direction.

Cool storage material containers (14) formed aluminum and filled with a cool storage material (not shown) are disposed in a plurality of front air-passing clearances (13A)

among all the front air-passing clearances (13) and (13A) of the front refrigerant flow tube row (4A) and in a plurality of rear air-passing clearances (13A) of all the rear air-passing clearances (13) and (13A) of the rear refrigerant flow tube row (4B), the front air-passing clearances (13A) being located at the same positions as the corresponding rear air-passing clearances (13A). Each cool storage material container (14) is disposed to extend across the air-passing clearances (13A) of the front and rear refrigerant flow tube rows (4A) and (4B), and is brazed (joined) to the corresponding refrigerant flow tubes (12) of the front and rear refrigerant flow tube rows (4A) and (4B), which tubes are located on the left and right sides of the cool storage material container (14). Corrugated fins (15) formed from an aluminum brazing sheet having a brazing material layer on each of opposite sides thereof are disposed in the remaining air-passing clearances (13) and are brazed to the corresponding refrigerant flow tubes (12). Furthermore, corrugated fins (15) formed from an aluminum brazing sheet having a brazing material layer on each of opposite sides thereof are disposed on the outer sides of the refrigerant flow tubes (12) located at the left-hand and right-hand ends, respectively, and are brazed (joined) to the corresponding refrigerant flow tubes (12). Moreover, side plates (16) formed of aluminum are disposed on the outer sides of the corrugated fins (15) located at the left-hand and right-hand ends, respectively, and are brazed to the corresponding corrugated fins (15).

As shown in FIGS. 2 and 3, each of the cool storage material containers (14) is composed of left and right side plates (17), a top plate (18), and a bottom plate (19). The left and right side plates (17) are formed by performing press work on an aluminum brazing sheet having a brazing material layer on each of opposite sides thereof, and front and rear edge portions of the left and right side plates (17) are brazed together along the entire length. The top plate (18) is formed by performing press work on an aluminum brazing sheet having a brazing material layer on each of opposite sides thereof, and is brazed to the upper ends of the left and right side plates (17). The bottom plate (19) is formed by performing press work on an aluminum brazing sheet having a brazing material layer on each of opposite sides thereof, and is brazed to the lower ends of the left and right side plates (17). Portions of the left and right side plates (17), excluding the front and rear edge portions thereof brazed tighter, are bulged outward with respect to the left-right direction so as to form outward bulging portions (21) which extend in the vertical direction, whereby a cool storage material charging space (22) is formed between the left and right side plates (17). The cool storage material charging space (22) extends in the vertical direction, and has opened upper and lower ends. The upper end opening of the cool storage material charging space (22) is closed by the top plate (18), and the lower end opening of the cool storage material charging space (22) is closed by the bottom plate (19). Preferably, a water-based cool storage material and a paraffin-based cool storage material having an adjusted freezing point of about 3 to 10° C. is charged into the cool storage material containers (14). Notably, in order to suppress variation in the temperature of discharged air when cooling is performed by only the cool storage material charged in all the cool storage material containers (14) and in order to increase the amount of the cool storage material charged in the cool storage material containers (14), preferably, three to seven air-passing clearances (13) (corrugated fins (15)) are present between the cool storage material containers (14) adjacent to each other in the left-right direction.

Preferably, the total of the air-flow-direction-upstream-side (rear-side) opening areas of the plurality of air-passing clearances (13A), in which the cool storage material containers (14) are disposed, is 5 to 30% the effective core area. Herein and in the claims, the term "effective core area" means the product of the shortest distance between the first and second header tanks (2) and (3) as measured in the vertical direction, and the shortest distance between the outer edge portions of the left-end and right-end corrugated fins (15) as measured in the left-right direction. When the total of the air-flow-direction-upstream-side opening areas of the plurality of air-passing clearances (13A), in which the cool storage material containers (14) are disposed, is less than 5% the effective core area, the amount of the cool storage material charged in the cool storage material containers (14) becomes insufficient, and the cool storage effect becomes insufficient. When the total of the air-flow-direction-upstream-side opening areas of the plurality of air-passing clearances (13A), in which the cool storage material containers (14) are disposed, exceeds 30% the effective core area, air-passage resistance may increase considerably.

A plurality of outward projecting convex portions (23) are formed on budging-side top wall (21*a*) of the outward bulging portion (21) of each of the left and right side plates (17) of each cool storage material container (14), by means of deforming the budging-side top wall (21*a*). The convex portions (23) extend in the vertical direction, and incline frontward toward the upper side, and are arrayed in the vertical and front-rear directions. The projecting end portions of the convex portions (23) have flat surfaces. The projecting end portions of a plurality of convex portions (23) located at a front end portion of each cool storage material container (14) and arrayed in the vertical direction are brazed to the outer surfaces of the corresponding refrigerant flow tubes (12) of the front refrigerant flow tube row (4A). Similarly, the projecting end portions of a plurality of convex portions (23) located at a rear end portion of each cool storage material container (14) and arrayed in the vertical direction are brazed to the outer surfaces of the corresponding refrigerant flow tubes (12) of the rear refrigerant flow tube row (4B). Accordingly, gaps (24) for air passage and water drain are formed between the cool storage material containers (14) and the refrigerant flow tubes (12) at locations where the cool storage material containers (14) and the refrigerant flow tubes (12) are brazed together. Notably, preferably, the shortest distance between the projecting end portions of the convex portions (23) of the left side plate (17) and the projecting end portions of the convex portions (23) of the right side plate (17), as measured in the left-right direction, is set to 5 to 11 mm. When the shortest distance is less than 5 mm, the amount of the cool storage material charged in the cool storage material containers (14) becomes insufficient, and the cool storage effect becomes insufficient. When the shortest distance exceeds 11 mm, air-passage resistance may increase considerably.

The interiors of all the cool storage material containers (14) are connected together via a hollow communication member (25) which is formed of aluminum and which is sealed entirely. The communication member (25) includes a trunk portion (26) extending in the left-right direction, and branch portions (27) which are equal in number to the cool storage material containers (14) and which are provided on the trunk portion (26) such that the branch portions (27) are spaced from one another in the left-right direction, and extend rearward. A through hole (not shown) is formed in a lower wall of a rear end portion of each branch portion (27), and the lower wall of each branch portion (27) is brazed to the top plate (18) of the corresponding cool storage material container (14) such that the through hole communicates with a through hole (not shown) formed in the top plate (18). A cool storage material charging port (28) is provided on the trunk portion (26) of the communication member (25). The cool storage material charging port (28) is closed after the cool storage material has been charged into all the cool storage material containers (14).

The above-described evaporator (1) with a cool storage function constitutes a car air conditioner in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. In the car air conditioner, when the compressor is operating, low pressure, two-phase refrigerant (a mixture of vapor refrigerant and liquid refrigerant) having been compressed by the compressor and having passed through the condenser and the expansion valve passes through the refrigerant inlet (7), and enters the inlet header section (5) of the evaporator (1). The refrigerant then passes through the refrigerant flow tubes (12) of the front refrigerant flow tube row (4A), and enters the first intermediate header section (9). The refrigerant having entered the first intermediate header section (9) enters the second intermediate header section (11). After that, the refrigerant passes through the refrigerant flow tubes (12) of the rear refrigerant flow tube row (4B), enters the outlet header section (6), and flows out via the refrigerant outlet (8). When the refrigerant flows through the refrigerant flow tubes (12), the refrigerant performs heat exchange with air (see arrow X in FIGS. 1 and 2) passing through the air-passing clearances (13) (among the air-passing clearances (13) and (13A)) in which the cool storage material containers (14) are not disposed, and flows out of the refrigerant flow tubes (12) in a vapor phase.

At that time, the cool storage material charged in each cool storage material container (14) is cooled by the refrigerant flowing through the refrigerant flow tubes (12) which are located on the opposite sides of the cool storage material container (14) and form the air-passing clearance (13A) in which the cool storage material container (14) is disposed. As a result, the cool storage material is frozen, whereby cool is stored therein. At that time, condensed water produced on surfaces (facing the cool storage material container (14)) of the refrigerant flow tubes (12) which are located on the opposite sides of the cool storage material container (14) and form the air-passing clearance (13A) in which the cool storage material container (14) is disposed is drained through the gaps (24) formed between the cool storage material container (14) and the refrigerant flow tubes (12) located on the opposite sides of the cool storage material container (14).

When the compressor stops, the cool stored in the cool storage material within each cool storage material container (14) is transferred to wind passing through the air-passing clearances (13) in which the corrugated fins (15) are present via the refrigerant flow tubes (12) located on the opposite sides of the cool storage material container (14). Further, the cool stored in the cool storage material within each cool storage material container (14) is transferred to wind passing through the gaps (24) between the cool storage material container (14) and the refrigerant flow tubes (12) located on the opposite sides thereof. Accordingly, even when the temperature of wind having passed through the evaporator (1) increases, the wind is cooled by the cool storage material containers (14), so that a sharp drop in the cooling capacity can be prevented.

In the above-described embodiment, the evaporator with a cool storage function may be a so-called laminated-type evaporator; i.e., an evaporator configured in which a plurality of flat hollow bodies each composed of a pair of dish-shaped plates which faces each other and are brazed together along the circumferential edges thereof are disposed in parallel, and the hollow bodies have refrigerant flow tube sections disposed in parallel such that their width direction coincides with the air flow direction and they are spaced from one another, and refrigerant header sections communicating with opposite end portions of the refrigerant flow tube sections; i.e., the refrigerant flow tube sections and the refrigerant header sections are unitarily provided.

INDUSTRIAL APPLICABILITY

The evaporator with a cool storage function according to the present invention relates is suitably used in a car air conditioner for a vehicle in which an engine serving as a drive source for a compressor is temporarily stopped when the vehicle is stopped.

The invention claimed is:

1. An evaporator with a cool storage function, comprising:

a plurality of refrigerant flow tubes each having a first side wall and a second side wall opposite to the first side wall and provided to form spaces between the first side wall and the second side wall such that the first side wall of one of the plurality of refrigerant flow tubes faces the second side wall of another of the plurality of refrigerant flow tubes, the spaces having a first part and a second part other than the first part;

fins provided in the first part of the spaces;

cool storage material containers containing a cool storage material, each of the cool storage material containers having a longitudinal direction and including a third side wall and a fourth side wall opposite to the third side wall, the third side wall and the fourth side wall having first convex portions and second convex portions, respectively, the cool storage material containers being provided in the second part of the spaces such that the first convex portions contact the first side wall of the one of the plurality of refrigerant flow tubes and the second convex portions contact the second side wall of the another of the plurality of refrigerant flow tubes, the first convex portions and the second convex portions extending to incline with respect to the longitudinal direction, wherein the interiors of all of the cool storage material containers are connected with one another via a communication member.

2. The evaporator with a cool storage function according to claim 1, wherein the first convex portions and the second convex portions extend from a lower portion to an upper portion along an air flow direction along which air is to flow through the evaporator for heat exchange.

3. The evaporator with a cool storage function according to claim 1, wherein interiors of the cool storage material containers are connected with one another, and wherein a cool storage material charging port is provided in one of the cool storage material containers.

4. The evaporator with a cool storage function according to claim 1, wherein a cool storage material charging port is provided in the communication member or one of the cool storage material containers.

* * * * *